March 10, 1925.

H. FORD

TRANSMISSION MECHANISM

Filed July 8, 1922    4 Sheets-Sheet 1,529,021

Inventor
Henry Ford,
By
Attorneys

March 10, 1925

H. FORD

TRANSMISSION MECHANISM

Filed July 8, 1922

Inventor.
Henry Ford,
By
Attorneys

Patented Mar. 10, 1925.

1,529,021

UNITED STATES PATENT OFFICE

HENRY FORD, OF DEARBORN, MICHIGAN.

TRANSMISSION MECHANISM.

Application filed July 8, 1922. Serial No. 573,623.

*To all whom it may concern:*

Be it known that I, HENRY FORD, a citizen of the United States of America, residing at Dearborn, in the county of Wayne and State of Michigan, have invented certain new and useful Improvements in Transmission Mechanism, of which the following is a specification, reference being had therein to the accompanying drawings.

This invention relates to a power transmission mechanism and my invention aims to provide a simple and efficient transmission gearing, and to organize the same into a power transmission system or mechanism for duplex, multiplex or branch drives. It is in this connection that the transmission mechanism has been especially designed for an automotive railway car including trucks, and a power plant substantially equidistant relative to said trucks and adapted for driving an axle on each truck. The power plant includes pairs of internal combustion engines and it is between the pairs of these engines that my transmission mechanism is placed so that power may be distributed at will.

My invention further aims to provide a railway car having driving wheels and engines for driving said wheels with a transmission to alter the gear ratio between engine shafts and the driving wheels; to reverse the direction of rotation of the driving wheels with respect to the engine; to disengage the engines functionally relative to the driving wheels, and to provide a brake for the car wheels through their drive independent of the usual wheel brakes.

My invention still further aims to provide a duplex transmission mechanism that may be mounted between two power plants to form a rigid structure that may be suspended or otherwise mounted under a vehicle body to drive trucks thereof, and the transmission mechanism includes planetary gearings, multiple disk clutch and other devices and instrumentalities, all of which are compactly assembled, dust proof, easy to lubricate and readily controlled from a remote point.

The above is a brief outline of my invention and the construction will now be described by aid of the drawings, wherein—

Figures 4, 5:
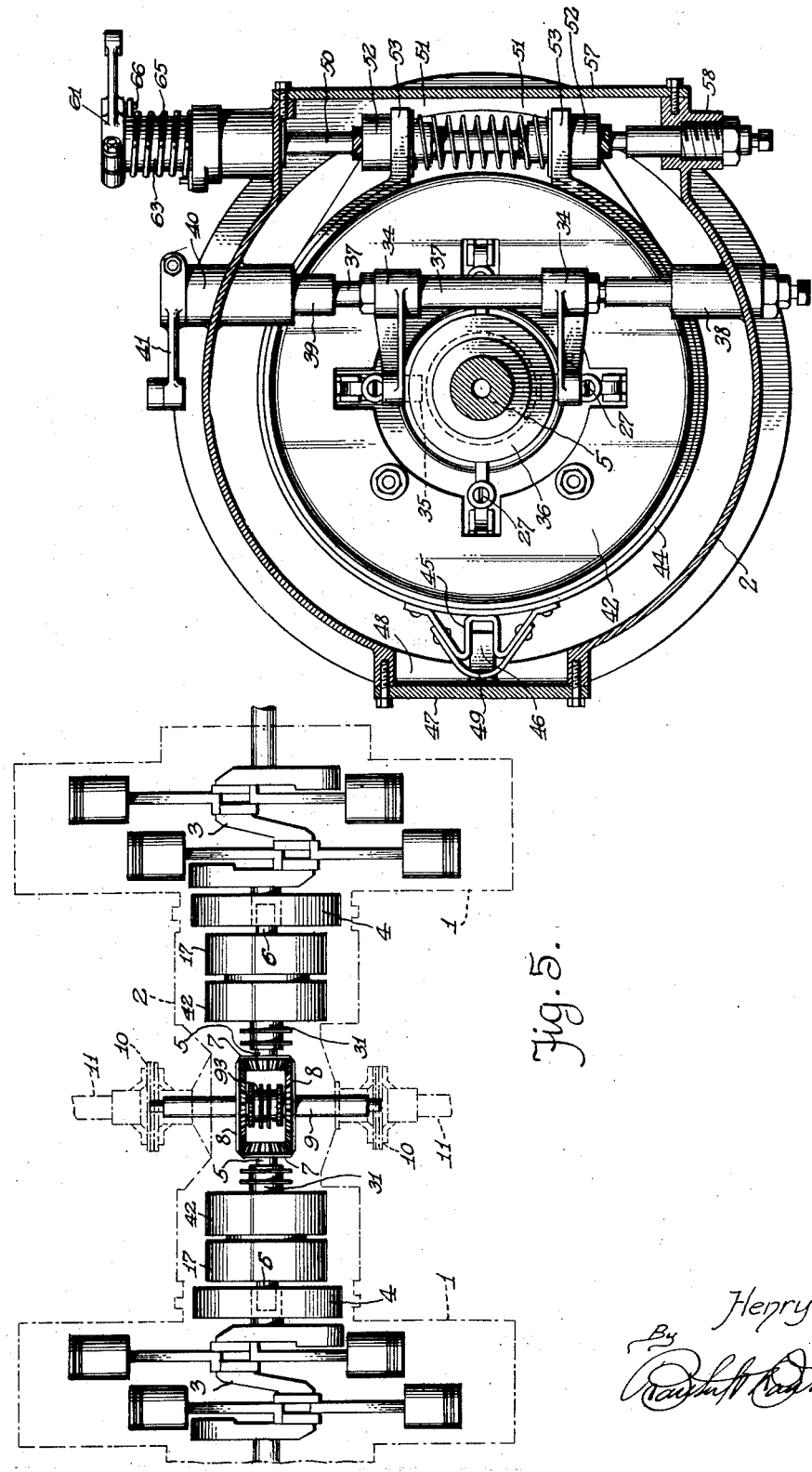
Fig. 4 is a similar view taken on the line IV—IV of Fig. 2.
Fig. 5 is a diagrammatic plan of the transmission mechanism relative to power plants.

Reference will first be had to Fig. 5 showing in outline opposed power plants 1 connected by a transmission housing 2 and each power plant includes a pair of horizontally disposed engines having a common crank shaft 3 and balance wheel 4. In the transmission housing 2 are transmission shafts which longitudinally aline with the crank shafts of the engines, each transmission shaft being composed of an inner section 5 and a coaxial outer section 6, said outer section being suitably coupled to the crank shaft. The inner shaft sections 5 are provided with beveled gear wheels 7 constantly meshing with beveled gear wheels 8 loosely mounted about a jack shaft 9 extending transversely of the transmission housing 2 and adapted to be coupled, as at 10, to power transmission shafts 11. The shafts 11 are adapted for performing work at points remote from the power plants, and as pointed out in the beginning, the power plants and the transmission mechanism may be advantageously used in connection with a railway car.

Thus far it will be noted that there are two opposed power plants adapted for driving a common jack shaft and between said jack shaft and each power plant there is a planetary gearing, a clutch mechanism, and controlling devices, and as such mechanisms for each power plant are identical, I deem it only necessary to describe in detail the construction and arrangement of one set of mechanisms, and then consider the control of both mechanisms.

The outer section 6 of each transmission shaft has longitudinal splines which permit of it being easily connected to an engine shaft. The inner section 5 of the transmission shaft has a bore 12 in which the outer section 6 is free to revolve. The splines of the outer shaft section 6 facilitate mounting various elements thereon, one of which is the hub portion 13 of a sun gear 14 and meshing with the sun gear are a plurality of pinions 15 which also mesh with an internal rack 16, carried by a drum 17 having its hub portion 18 free to revolve on the hub portion 13 of the sun gear 14.

Mounted on the outer shaft section 6 adjacent the sun gear 14 is the hub portion 19 of an inner cylindrical clutch shell 20 supporting a multiplicity of parallel clutch disks 21 some of which are keyed or otherwise mounted for rotation with the clutch shell 20 and other of said disks held for rotation with an outer clutch shell 22 rotatable on an anti-frictional bearing 23 mounted on the hub 19 of the inner clutch shell 20. Mounted against the outer clutch shell 22 and cooperating therewith in providing an enclosure for the clutch disks is an end cover 24 cooperating with the outer shell 22 in supporting spindles 25 extending into the drum 17 and supporting the pinions 15 which cooperate with the sun gear 14 and the rack 16 in forming planetary gearing. The pinion spindles 25 are utilized to hold some of the clutch disks 21 for rotation with the outer clutch shell 22 and all of the clutch disks are disposed for slight longitudinal movement between the clutch shells so that said disks may be crowded for frictional engagement to establish, at times, a driving relation between the inner and outer clutch shells. At other times one set of disks are free to revolve relative to adjacent disks, but normally the disks establish a driving relation between the inner and outer clutch shells. To maintain this driving relation a presser ring 26 engages one of the inmost clutch disks 21 and said presser ring is carried by plungers 27 slidable in the end cover 24. The outer ends of the plungers 27 are suitably connected to levers 28 which have the outer ends thereof pivotally connected, as at 29 to the end cover 24. The inner ends of the levers 28 are engaged by a peripheral flange 30 of an outer spring housing 31, said outer spring housing cooperating with an inner spring housing 32 in enclosing a coiled expansion spring 33 about the inner shaft section 5. The inner spring housing 32 is held against movement, as will hereinafter appear and the expansive force of the spring 33 shifts the outer spring housing 31 so that the levers 28 will push inwardly on the plungers 27 and cause the clutch disks to be engaged with one another to establish a driving relation between the inner and outer clutch shells.

The means employed for retracting the outer spring housing 31 to release the levers 28 and one set of clutch disks relative to the other set comprises a yoke 34 which is vertically disposed at one side of the outer spring housing 31 and has roller equipped pins 35 engaging in an annular groove of a collar 36 forming part of the outer spring housing 31. The yoke 34 is carried by a rock shaft 37, best shown in Figs. 1 and 4 and the ends of said rock shaft are supported from the transmission housing 2. The lower end of the rock shaft is held for adjustment in an end thrust bearing 38 carried by the bottom wall of the transmission housing 2, and the upper end of the rock shaft is mounted in a crank shaft 39 journaled in a bearing 40 carried by the top wall of the transmission housing 2. On the upper or outer end of the crank shaft 39 is clamped a crank 41 which will be hereinafter referred to.

The manner of connecting the pinion spindles 25 to the end cover 24 permits of a drum 42 being attached to the end cover 24 for rotation with the outer clutch shell 22, said drum inclosing the outer clutch shell and extending in proximity to the drum 17, to afford a compact arrangement and permit of split bands 43 and 44 being placed about the drums 17 and 42 respectively to engage and hold said drums stationary, at times. The split bands 43 and 44 are identical in construction and the middle portion of each band has an exterior channel member 45 engaging inwardly projecting lugs 46, carried by a cover 47 mounted over an opening 48 in a side wall of the transmission housing 2. Connected to each channel member 45 is a strap 49 extending between the lugs 46 to prevent lateral shifting of the band and circumferential creeping is prevented by the channel member. Each band is anchored so that its split ends may be shifted to either contract the band about a drum or distend the band to release the drum, and each band may have a suitable drum engaging shoe.

The mechanism employed for adjusting the bands 43 and 44 comprises vertically disposed parallel shafts 50 provided with right and left hand screwthreaded portions 51 on which are nuts 52 engaging laterally extending ends 53 of each band. Interposed between the laterally extending ends 53 of each band is a coiled expansion spring 54 having its end convolutions engaging and encircling thimbles 55 about the threaded portions 51 of each shaft and abutting the lateral ends 53 of each band. The expansive force of the spring 54 is adapted to distend the band so as to release the drum which it surrounds and when either of the shafts 50 is rotated in one direction the nuts 52 thereon are shifted towards each other to contract the band about the drum.

Figure 1:
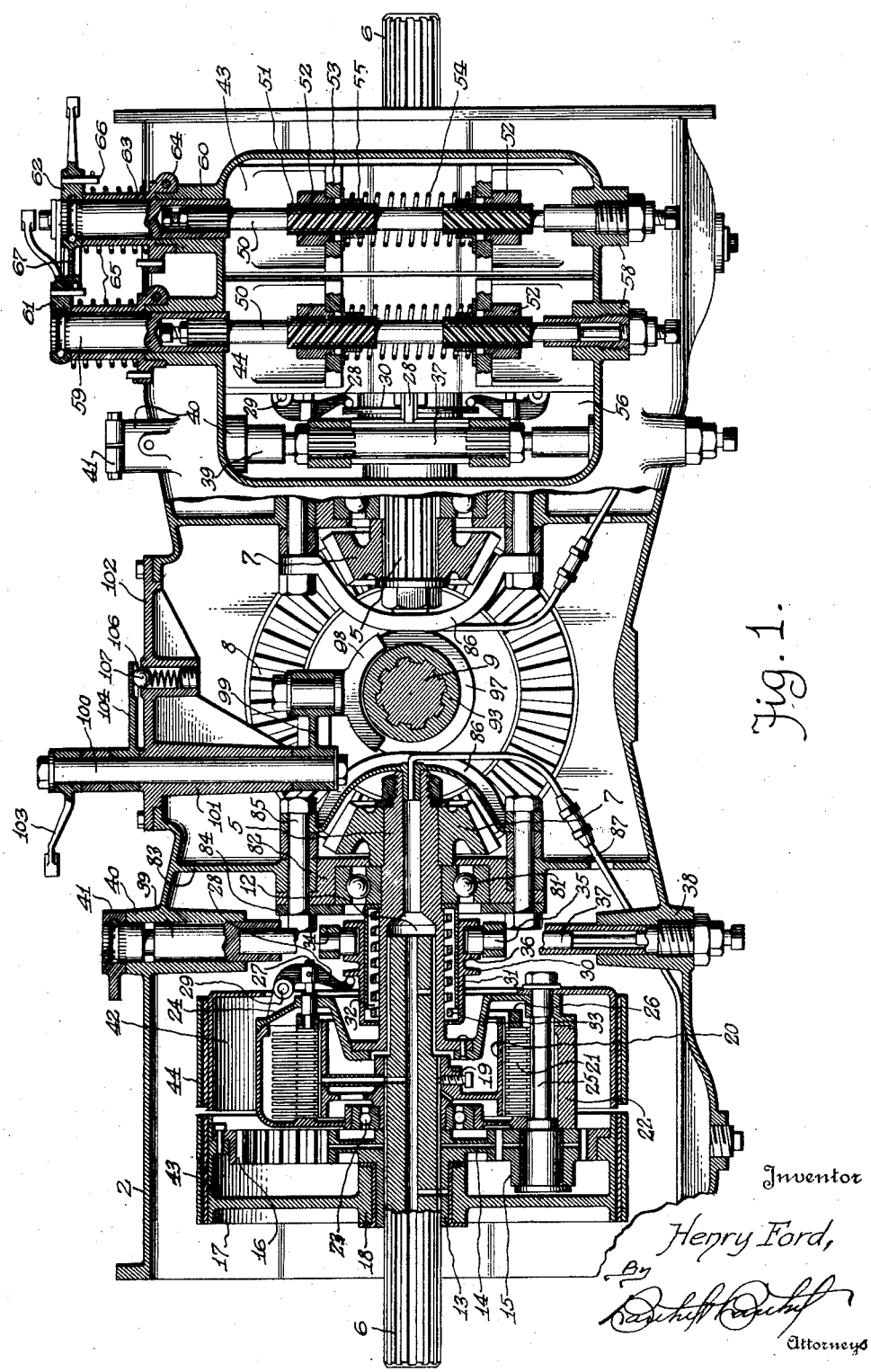
Figure 1 is a vertical longitudinal sectional view of the transmission mechanism, partly in elevation.

The shafts 50 are located in an offset portion or casing 56 of the transmission housing, said casing having a detachable plate 57 so that access may be had thereto. The lower ends of the shafts 50 are supported in adjustable end thrust bearings 58 carried by the bottom wall of the casing and the upper ends of said shafts are adjustable in crank shafts 59 journaled in bearings 60, carried by the top wall of the casing 56. Clamped on the outer ends of the crank shafts 59 are cranks 61 and 62 and surrounding the outer ends of said crank shafts, as best shown in Figs. 1 and 4, are tubular spring supports 63 having the lower ends thereof adjustably clamped, as at 64 on the bearings 60. Surrounding the spring supports 63 are coiled springs 65 which have the lower convolutions thereof anchored at the lower ends of the supports 63 and the upper convolutions of said springs engage pins 66 of the cranks 61 and 62 with the expansive force of each spring adapted to restore each crank to normal position after being actuated. The crank 62 has a cam 67 engaging an anti-frictional roller 68 carried by one arm of a bell crank 69 pivoted on an upstanding pin 70 of the transmission housing 2 and this pin is braced relative to the upper end of the crank shaft 59 on which is mounted the crank 62 by a connecting strap 71. The other arm of the bell crank 69 is connected to the clutch operating crank 41 by an adjustable link or conventional form of turn buckle 72.

The top wall of the transmission casing 2, intermediate its ends and at that side wall which has the casings 56 is provided with an enlargement 73 to which is connected a bracket 74 and rotatably supported on said bracket are sets of superposed sheaves 75 having the spindles 76 thereof braced by straps 77 connected to the brackets 74. On the spindles 76 of the sheaves 75 are guards or guides 78 for cables or flexible members 79 and 80 connected to the cranks 62 and 61 respectively. The cables 79 and 80 extend over the sheaves 75 and to some remote point of control, such control being brought out in my pending application for automotive railway cars filed May 13, 1921, Ser. No. 469,146.

Reference will again be had to Fig. 1 showing the inner section 5 of the transmission shaft to be journaled in an anti-frictional bearing 81 mounted in a cage 82 set in a transverse partition 83 of the transmission housing. The inner spring housing 32 abuts the anti-frictional bearing 81 and said bearing is retained in the cage 82 by a ring 84, which together with the cage 82 is connected to the partition 83 by nut equipped bolts 85. These bolts are also employed for supporting a yoke 86 in proximity to the beveled gear 7 on the shaft section 5 and said yoke constitutes a support for one end of a lubricant supply tube or conduit 87. The conduit 87 may be supplied with lubricant from a pump or any suitable source and the lubricant is adapted to flow through the shaft section 5 into the shaft section 6 and by virtue of numerous ports, grooves, passages and conduits be distributed into the clutch and on to such bearings and wearing parts throughout the planetary gearing and other mechanisms or devices of the transmission mechanism.

Figure 3:
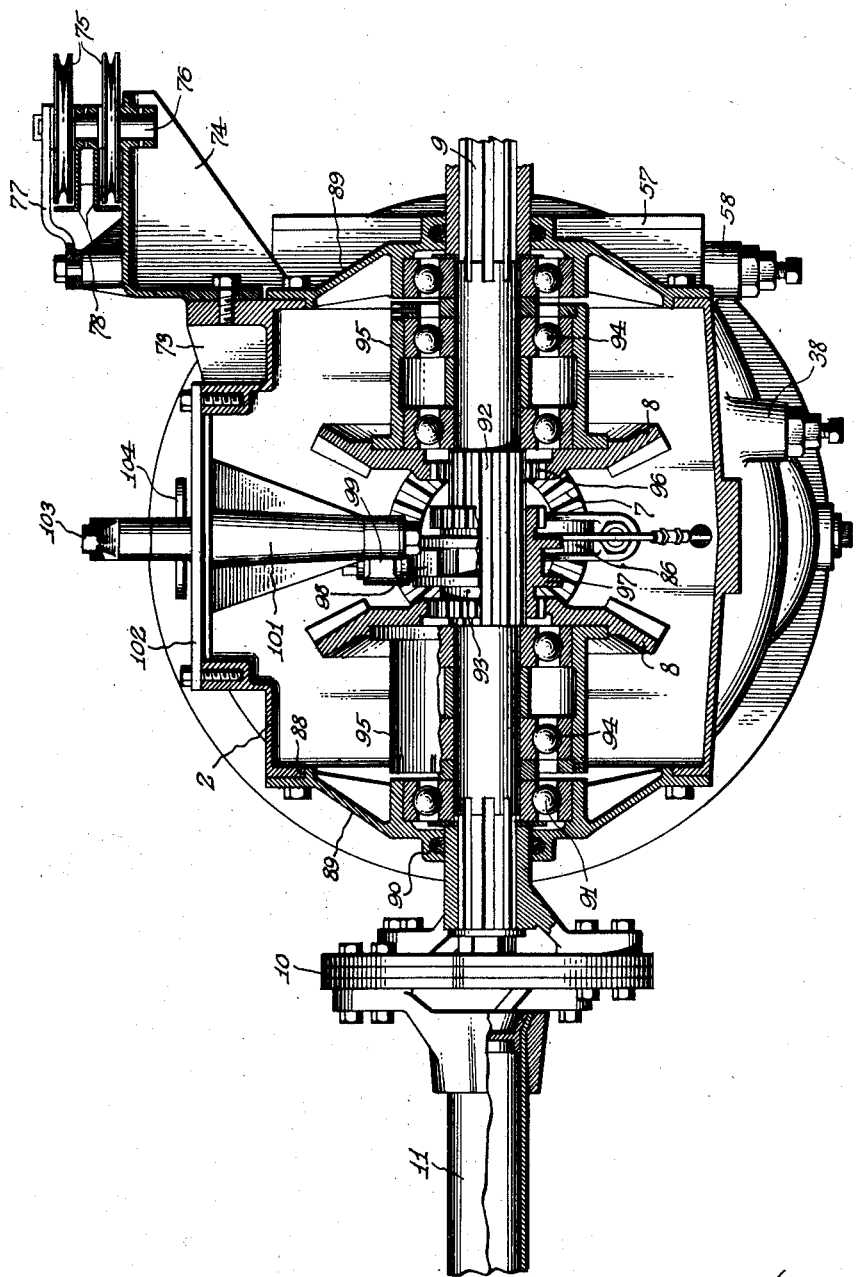
Fig. 3 is a cross sectional view taken on the line III—III of Fig. 2.

Considering Fig. 3, it will be noted that the transmission housing 2 has opposed side openings 88 intermediate the ends thereof and these openings are normally closed by detachable side plates 89 provided with dust guards 90 and anti-frictional bearings 91. The jack shaft 9 is journaled in the anti-frictional bearings 91 and intermediate the ends of said jack shaft is a splined portion 92 for a compound gear wheel or clutch member 93 which may be shifted longitudinally of the jack shaft. On the jack shaft 9 are anti-frictional bearings 94 supporting the hubs 95 of the beveled gear wheels 8 and these beveled gear wheels have internal gears or clutch members 96 adapted to be alternately or independently engaged by the compound gear or clutch member 93, so that a driving relation may be established between either of the beveled gear wheels 8 and the jack shaft 9. On the compound gear or clutch member 93 is a grooved collar 97 and engaging in said collar is a shoe 98 loosely supported by a crank 99 on the lower end of a vertically disposed crank shaft 100, said crank shaft being journaled in a bearing 101 carried by a detachable top plate 102 of the transmission housing 2.

Figure 2:
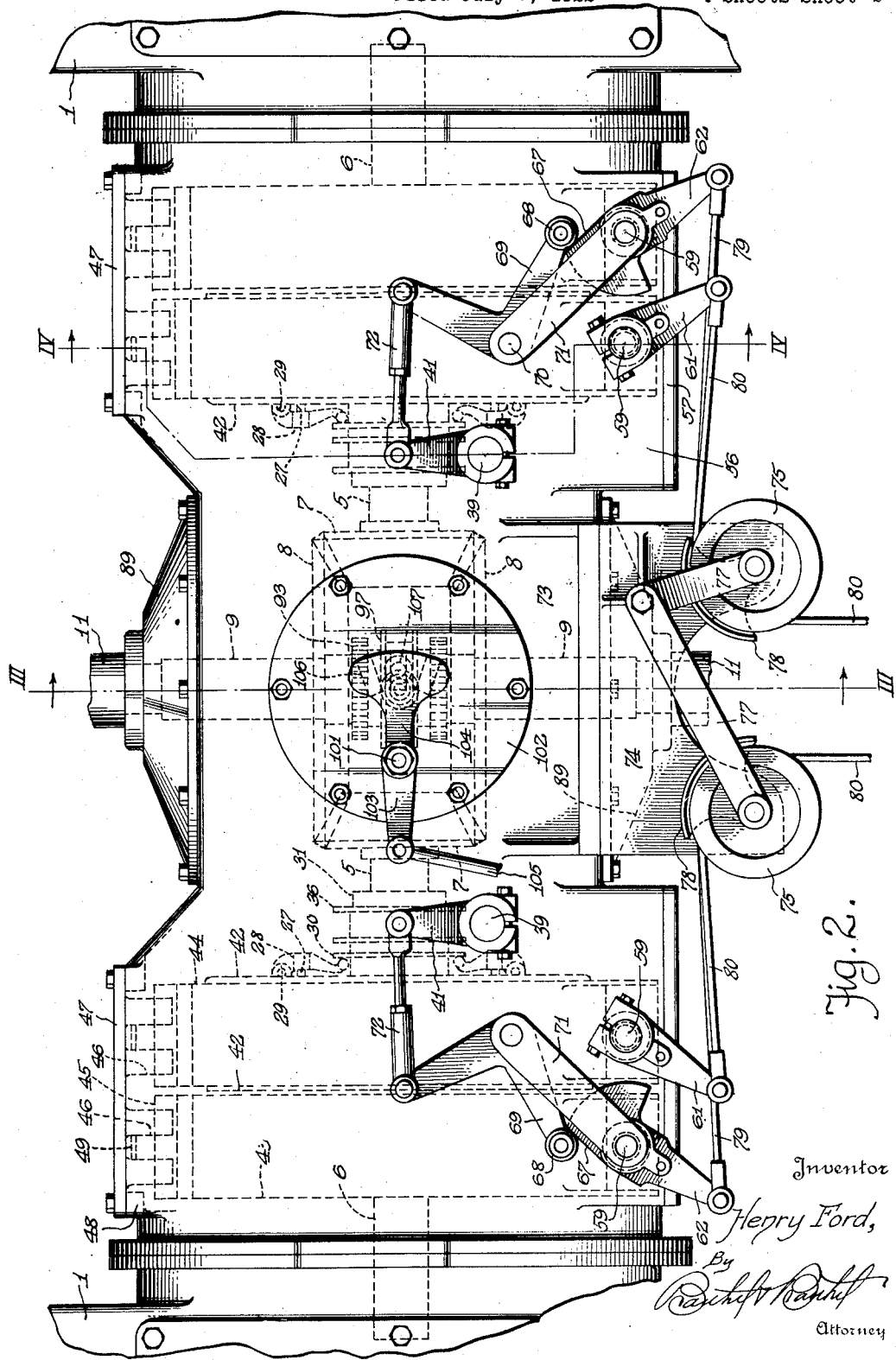
Fig. 2 is a plan of the same.

On the upper end of the crank shaft 100 are cranks 103 and 104, the former being connected to an operating rod 105 and the latter provided with grooves or sockets 106 for a spring pressed detent 107 carried by the top plate 102. The detent 107 prevents accidental shifting of the crank shaft 100 and determines three positions for the compound gear or clutch member 93, one of said positions being neutral as shown in Fig. 2 and the other positions being with the compound gear or clutch member 93 in engagement with one or the other of the internal gears or clutch members 96. It is thought the medium of the beveled gear wheels 7 and 8, internal gears or clutch members 96, compound gear or clutch member 93, and jack shaft 9 that either forward or reverse drive may be imparted to the power transmission shafts 11 from the power plants 1.

Considering the operation of the power transmission mechanism and assuming the power plants 1 have been placed in operation, it has already been pointed out that the power transmission shafts 11 may be driven in a desired direction. It is of course, obvious that the operation of the power plants may control the speed of the transmission shafts 11, but in addition to such control the set of cables or flexible members 79 may be actuated to simultaneously release the clutch disks 21 relative to one another and apply the bands 43 to the drums 17 to hold said drums stationary and cause the planetary gearing to transmit power, at a reduced speed, from the outer shaft section 6 through the sun gear 14 and pinions 15 to the outer clutch shell 22, drum 42 and inner shaft section 5 which is connected to the end cover 24, as best shown in Fig. 1. In this manner either of the power transmission shafts 11 may be operated at a reduced speed, and for any speed the bands 44 may be applied to the drums 42 to serve as brakes and thus retard or stop rotation of the power transmission shafts. This is a braking action, in addition to the usual wheel brakes, to control the movement of the car after the power plants have ceased to operate.

It is thought that the operation and utility of my power transmission mechanism will be apparent without further description, and while in the drawings there is illustrated a preferred embodiment of my invention which has been put into practice, I do not care to confine my invention to the precise construction disclosed other than defined by the appended claims.

What I claim is:—

1. In a power transmission mechanism, a jack shaft, opposed transmission shafts disposed at an angle to said jack shaft and operatably connected thereto, a speed reduction gearing on each opposed shaft, a clutch mechanism for each opposed shaft, controlling its application of power to said jack shaft, and controlling means for said speed reduction gearing and said clutch mechanisms.

2. A power transmission mechanism as called for in claim 1, wherein said controlling means comprises a brake band for each speed reduction gearing, a brake band for each clutch, and an operating mechanism for each brake band.

3. A power transmission mechanism as called for in claim 1, wherein said clutch mechanism is adapted for actuating in synchronism with the speed reduction mechanism.

4. A power transmission mechanism as called for in claim 1, wherein the operative relation between said jack shaft and said transmission shafts is established by gearing and a clutch by which said jack shaft may be rotated by said transmission shafts in a desired direction.

5. The combination of a jack shaft, opposed driven transmission shafts, beveled gear wheels loose on said jack shaft and driven from the transmission shafts, a clutch between said gear wheels and adapted to fix either gear wheel relative to said jack shaft, and means in each transmission shaft by which a reduction in speed may be attained, each of said transmission shafts being in two sections with a clutch mechanism controlling the operative relation between the shaft sections.

6. The combination of a jack shaft, opposed driven transmission shafts, beveled gear wheels loose on said jack shaft and driven from said transmission shafts, a clutch between said gear wheels and adapted to fix either gear wheel relative to said jack shaft, and means in each transmission shaft by which a reduction in speed may be attained, each of said transmission shafts being provided with means by which its application of power to said jack shaft may be controlled.

7. A transmission mechanism comprising a two-part shaft, drums about said shaft, a planetary gearing in one drum adapted to transmit power at a reduced speed from one shaft part to the other, a clutch in the other drum and cooperating with said planetary gearing, brake bands about said drums, screw shafts and nuts adapted to set said brake bands, clutch actuating means, means adapted to simultaneously operate the screw shaft of the band about the planetary gearing drum and said clutch actuating means, and means adapted to actuate the brake band about said clutch drum independent of said clutch actuating means.

In testimony whereof I affix my signature in the presence of two witnesses.

HENRY FORD.

Witnesses:
E. G. LIEBOLD,
J. E. HALL.